United States Patent [19]

Hicks

[11] Patent Number: 5,211,213
[45] Date of Patent: May 18, 1993

[54] WHEEL FOR SHOPPING CARTS

[76] Inventor: Jimmy L. Hicks, P & H Casters, 4075 Schaefer, Chino, Calif. 91710

[21] Appl. No.: 733,136

[22] Filed: Jul. 16, 1991

[51] Int. Cl.⁵ ............................................... B60C 7/24
[52] U.S. Cl. ..................................... 152/323; 301/64.7; 301/95
[58] Field of Search ............................ 152/323–327, 152/328, 329; 301/95–99, 64.7, 64.4

[56] References Cited

U.S. PATENT DOCUMENTS

| | | | |
|---|---|---|---|
| 1,475,094 | 11/1923 | Tuttle | 152/323 X |
| 1,865,432 | 7/1932 | Bossert | 152/323 X |
| 2,713,373 | 7/1955 | Daugherty | 152/327 X |
| 3,066,716 | 12/1962 | Fishman | 152/323 |
| 3,695,728 | 10/1972 | Haussels | 301/63 PW X |
| 4,362,202 | 12/1982 | Sacks | 152/325 |
| 4,561,481 | 12/1985 | Kawauchi et al. | 152/379.3 |
| 4,592,595 | 6/1986 | Freeman | 301/63 PW |
| 4,923,252 | 5/1990 | Plamper et al. | 152/323 X |
| 4,944,563 | 7/1990 | Pinchbeck et al. | 152/323 X |

FOREIGN PATENT DOCUMENTS 13105  6/1903  United Kingdom ................ 152/324

*Primary Examiner*—Russell D. Stormer
*Attorney, Agent, or Firm*—Edgar W. Averill, Jr.

[57] ABSTRACT

A wheel for shopping carts. The wheel has a unitary, polymeric hub with a pair of opposed bearing cavities. An annular tire supporting groove has a pair of sloped sidewalls and a base which includes several sharp ribs. A relatively thick rubber tire is held in the annular groove and is expanded and placed in the groove under tension so that its inner edge is deformed by the sharp ribs, thus holding the tire in place.

4 Claims, 3 Drawing Sheets

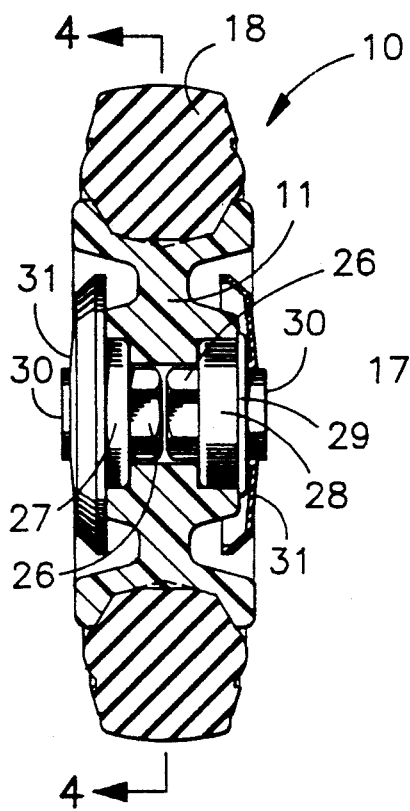
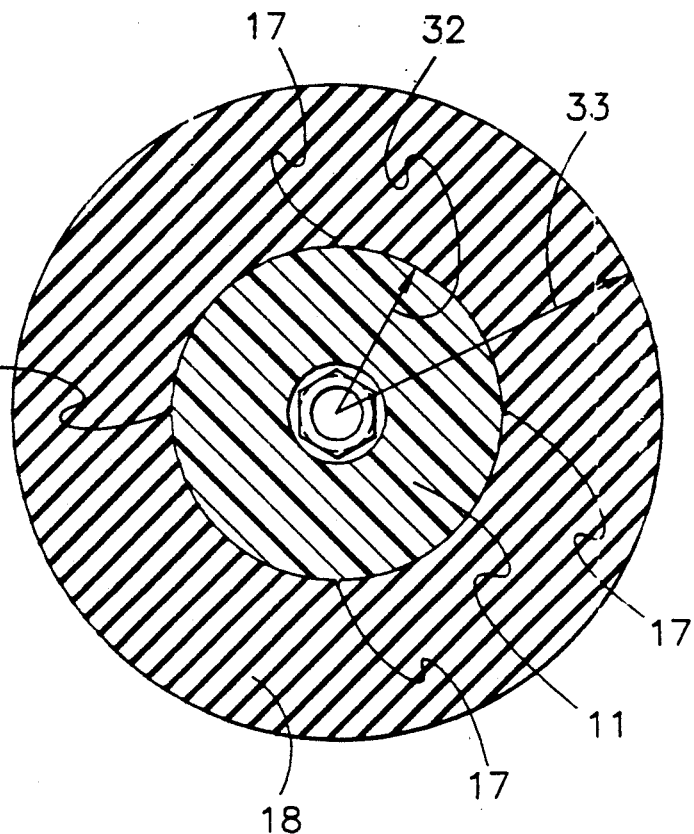
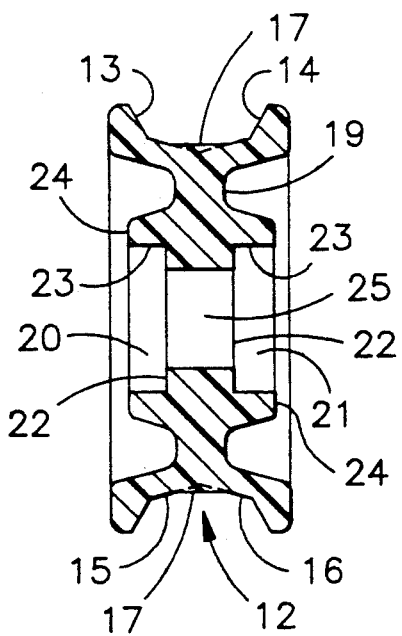
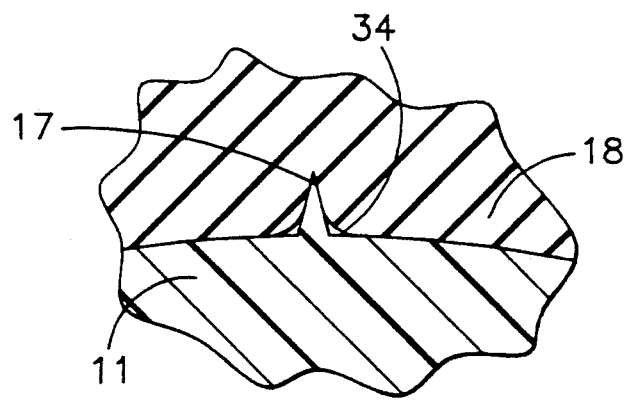

5,211,213

WHEEL FOR SHOPPING CARTS

BACKGROUND OF THE DISCLOSURE

The field of the invention is wheels, and the invention relates more particularly to wheels for shopping carts.

Shopping carts provide a unique challenge in that the shopping carts are becoming larger and, particularly in super stores, are often loaded with a substantial weight. While prior art wheels were satisfactory for the smaller and lighter carts, the trend toward heavier carts has resulted in unacceptable stress to the wheel bearings, often leading to bearing failure or bearing separation from the wheels. Furthermore, the tile floors commonly used in stores has changed. Whereas in the past asbestos was used as a reinforcing fiber, this is no longer the case. The resulting newer tiles are thus much softer than the old tiles.

In the past, the most common shopping cart wheel was a two part rubber wheel which had a hard rubber core which was coated with a bonding agent and a softer rubber tread was molded onto the hard rubber core. The bearings were supported by a cylindrical axial opening. With the heavier loads, the bearing tends to become loose from the hard rubber core, particularly when the cart is rolled through a turn over a rough surface such as a parking lot while the cart is carrying a heavy load. Also, the softer rubber tread often breaks away from the heavy load, resulting in a very rough ride. Furthermore, the black rubber tread can mark the floor with black streaks Because of the shortcomings of the two-part rubber wheels, there has been a trend toward a polyurethane wheel, which has captured the majority of the present market. The polyurethane wheel has a plastic hub and a polyurethane tread is injection molded on the outer surface. Unfortunately, the polyurethane tread is relatively hard and results in a rough ride for a loaded cart, particularly on a parking lot or other roughened surface. Furthermore, because the floor tiles are now softer without the presence of asbestos, the relatively hard polyurethane tread tends to dig into the floor and damage it. Also, because the polyurethane tread is relatively hard, the shock caused by going over a rough surface is transferred to the bearings, and the bearings often are destroyed or break away from the axial opening in which they are kept. Lastly, polyurethane wheels can cause a problem with static electricity. The acrylic floor waxes commonly used today, when combined with the low humidity created by the refrigeration systems used in the store, results in a buildup of static electricity when a cart having polyurethane wheels is wheeled along a polished floor. When the shopper is wearing insulative, rubber-soled shoes, the charge passes up through the cart, into the shopper and, when the shopper touches an electrically grounded display case frame, an uncomfortable spark can result.

SUMMARY OF THE INVENTION

It is an object of the present invention to provide a shopping cart wheel which is capable of handling heavy loads without destroying the bearings, without destroying the floor tile and without resulting in static electricity shocks.

The present invention is for a shopping cart wheel which has a unitary hub having an axis of rotation. The hub has first and second sides and a central opening for an axle. First and second bearing cavities are formed on each side of the hub, and the bearing cavities have a cylindrical side wall and a bearing cavity base. There is also a bearing rim support ring on the first and second sides. The hub extends outwardly, then inwardly and again outwardly to a radially extending wall portion terminating in a tire-supporting annular groove. The annular groove has a pair of sloped sidewalls and a base, and the base includes a plurality of sharp ribs extending upwardly from the base. Four ribs are preferred. First and second bearing means are held in the first and second bearing cavities, and the bearing means rest both on the bearing cavity base and on the bearing rim support. A rubber tire is held in the annular groove, and the rubber tire is held without any adhesive. The rubber tire is relatively thick and has an inside radius and an outside radius. The inside radius is about one-half of the outside radius so that the tire is capable of absorbing a large amount of shock. Preferably, the tire is compounded from natural rubber and the hub is preferably made from high-density, high-impact polypropylene. The wheel is fabricated by injection molding the hub. The rubber tire is separately molded and then is expanded and stretched over the rim into the annular groove, where it is held simply by the natural elasticity of the rubber and its contact with the sharpened ribs.

BRIEF DESCRIPTION OF THE DRAWINGS

FIG. 3 is a cross-sectional view of the shopping cart wheel of FIG. 1 taken parallel to the axis of rotation.

FIG. 4 is a cross-sectional view of the shopping cart wheel of FIG. 1 taken at right angles to the axis of rotation.

FIG. 5 is an enlarged view of one of the sharpened ribs of the shopping cart wheel of FIG. 1.

FIG. 6 is a cross-sectional view of the hub of the shopping cart wheel of FIG. 1.

DESCRIPTION OF THE PREFERRED EMBODIMENTS

Figure 1:
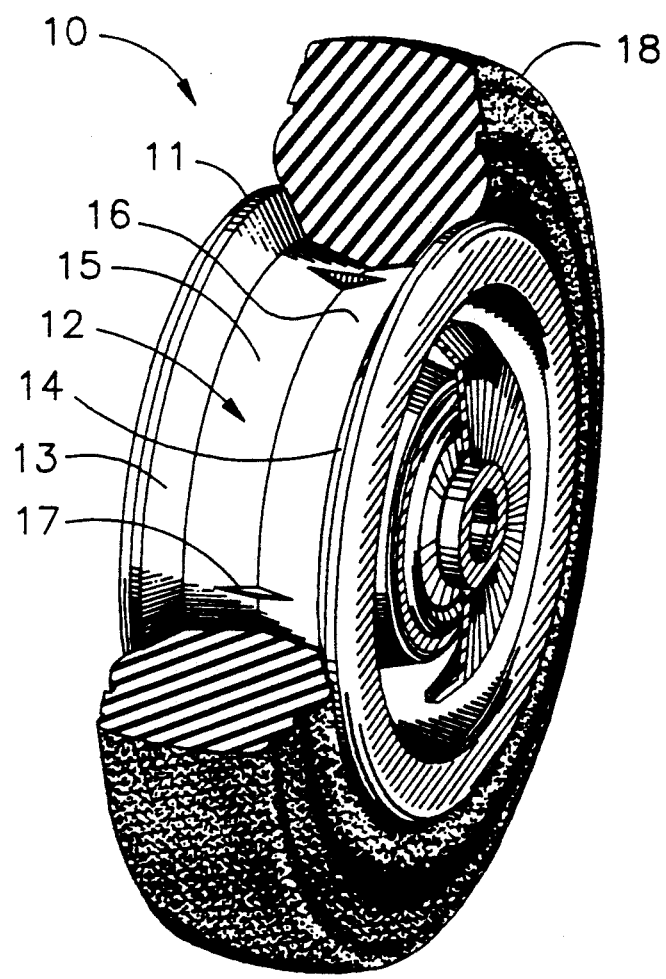
FIG. 1 is a perspective view of the shopping cart wheel of the present invention partly broken away.

The shopping cart wheel of the present invention is shown in perspective view in FIG. 1 and indicated by reference character 10. Wheel 10 has a hub 11 which has an annular rubber tire supporting groove 12 which, in turn, has a pair of sloped sides 13 and 14. Tire support groove 12 has a base which includes two sloped faces 15 and 16 and four sharpened ribs 17. A solid rubber tire 18 has been stretched over one of the sloped sides 13 or 14 and is elastically held in tire support groove 12 without the benefit of any adhesive. As shown best in FIG. 5, the sharpened ribs distort the tire and prevent it from turning with respect to hub 11.

The bearing support portion of hub 11 is shown best in FIG. 3 where it can be seen that hub 11 is a unitary member. It is injection-molded from a material having high impact strength, such as high-impact, high-density polypropylene. Hub 11 has two identical bearing cavities, namely first bearing cavity 20 and second bearing cavity 21. Each cavity has a cavity base 22, a cylindrical bearing support ring 23 and a bearing rim support ring 24. A central axial opening 25 holds the inner portion 26 of bearings 27 and 28. The bearing flange 29 of bearing 28 rests against the bearing rim support ring 24. Thus, the two bearings are securely held and are capable of withstanding a substantial side load placed upon the assembly. Each bearing has an outer ring 30 which holds a cap 31. Cap 31 helps to protect the bearing during washing and preferably curves inwardly as shown in FIG. 3.

As shown in the cross-sectional view of FIG. 4, the solid rubber tire 18 has an inside radius 32 and an outside radius 33. Tire 18 is of sufficient thickness so that the inside radius is about one-half of the outside radius. This provides a substantial amount of shock-absorption ability and provides a much softer ride for the cart. Because the rubber tire 18 is much softer than the prior art polyurethane tread, it does not tend to harm or damage the underlying floor.

Figure 2A:
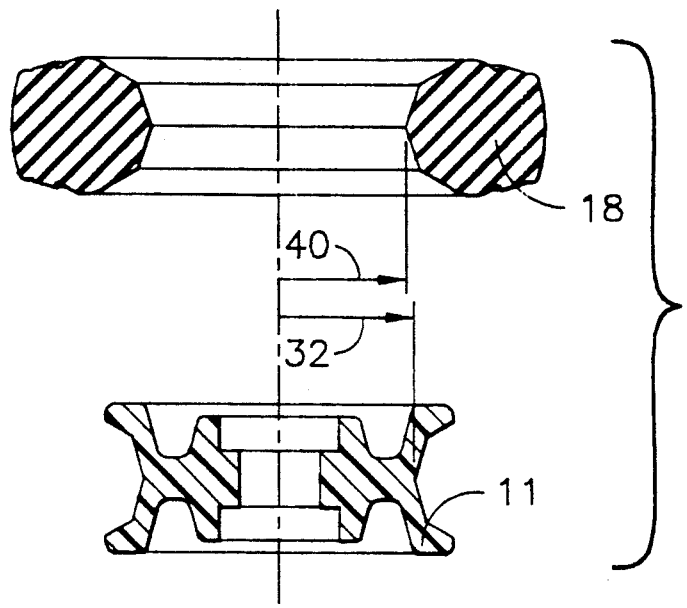
FIG. 2a shows the rubber tire and hub before assembly.
Figure 2B:
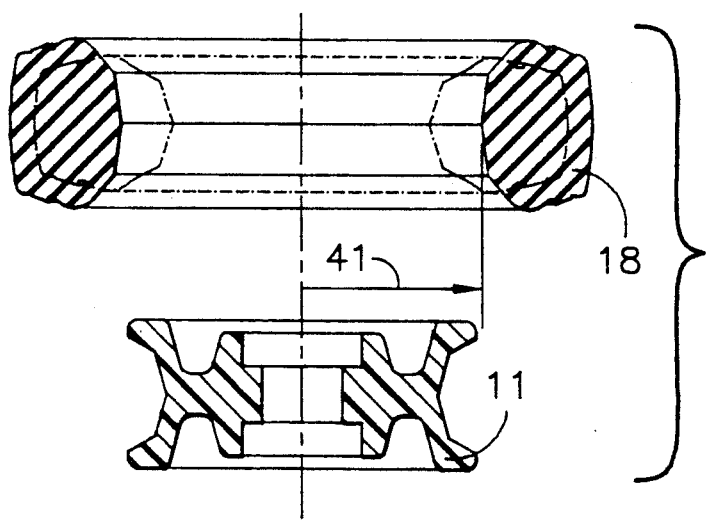
FIG. 2b shows the rubber tire and hub during assembly.
Figure 2C:
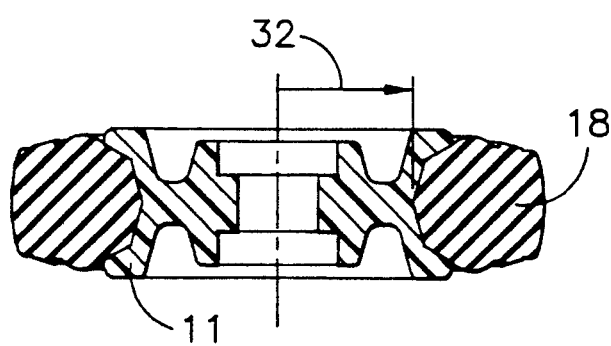
FIG. 2c shows the rubber tire and hub after assembly.

As shown in FIG. 2a, the relaxed tire as molded has a smaller inside radius 40 than the hub 11, radius 32. The tire is stretched over the hub as shown in FIG. 2b and a stretched radius 41 sufficient to permit it to pass over one of the sloped sides 13 or 14. As installed in FIG. 2c, the tire is elastically pressing against the sloped faces 15 and 16 and against the ribs 17. As shown in FIG. 5, the sharp rib 17 deforms the rubber tire, as shown at reference character 34, making it almost impossible for the rubber tire to turn separately with respect to the hub.

The hub design includes a narrowed portion indicated by reference character 19 which helps absorb whatever portion of the side load which the tire itself does not absorb. Although four sharp ribs are shown in FIG. 4 of the drawings, a greater or lesser number can of course be used, although four is the preferred number.

The rubber formulation should be soft enough so that the tire can absorb most of the shock, and it has been found that, by using natural rubber with less than 50% reinforcing and filling ingredients, that a particularly effective wheel results. A preferred formulation is 55% natural rubber and 45% other ingredients. This permits the tire to be stretched as shown in FIG. 2b.

The process of fabricating this shopping cart wheel of the present invention involves two separate molding steps. The hub is injection-molded from a high-impact-resisting polymer. The rubber tire is separately molded and, preferably after it has cooled, is expanded over one of the rims into the tire supporting groove without the use of any adhesive. The bearings are merely pushed into the cavities and are securely held therein by the yoke, which is conventional and not shown.

The resulting assembly can be made sufficiently economically to be used on shopping carts and provides a far more comfortable ride, particularly when being pushed over a rough surface such as an asphalt parking lot. Also, because the bearings are supported in individual cavities and further are protected by the softness of the rubber tire, the wheel is particularly long-lasting.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A process for fabricating a shopping cart wheel comprising the steps of:
   injection molding a unitary hub having a central axial opening with a pair of bearing support cavities and an annular tire holding groove having an inside radius, said tire holding groove having a plurality of outwardly extending ribs and upwardly extending sloped sidewalls;
   molding a rubber tire in a tire mold under heat and pressure, said tire having an inside diameter slightly smaller than the inside radius of said tire holding groove of said unitary hub; and
   removing the rubber tire from the tire mold;
   expanding said tire radially over one of said upwardly extending sloped sidewalls of said annular tire holding grooves; and
   releasing the rubber tire so that it contracts into the tire holding groove and abuts the plurality of outwardly extending ribs.

2. The process of claim 1 further including inserting first and second bearing assemblies into the pair of bearing support cavities.

3. The process of claim 1 wherein said hub is molded of high impact polypropylene.

4. The process of claim 1 wherein said tire is molded of about 55% natural rubber.

* * * * *